United States Patent
Takahashi (10) Patent No.: US 9,680,597 B2
(45) Date of Patent: Jun. 13, 2017

(54) OPTICAL BRANCHING/COUPLING DEVICE AND OPTICAL BRANCHING/COUPLING METHOD

(71) Applicant: NEC CORPORATION, Tokyo (JP)

(72) Inventor: Yurie Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 14/425,656

(22) PCT Filed: Sep. 24, 2013

(86) PCT No.: PCT/JP2013/005608
§ 371 (c)(1),
(2) Date: Mar. 4, 2015

(87) PCT Pub. No.: WO2014/050064
PCT Pub. Date: Apr. 3, 2014

(65) Prior Publication Data
US 2015/0256283 A1 Sep. 10, 2015

(30) Foreign Application Priority Data
Sep. 27, 2012 (JP) .................................. 2012-213922

(51) Int. Cl.
*H04Q 11/00* (2006.01)
*H04J 14/02* (2006.01)

(52) U.S. Cl.
CPC ........ *H04J 14/0227* (2013.01); *H04J 14/021* (2013.01); *H04J 14/0209* (2013.01); *H04Q 11/0005* (2013.01); *H04Q 2011/0037* (2013.01)

(58) Field of Classification Search
None
See application file for complete search history.

(56) References Cited

U.S. PATENT DOCUMENTS

| | | | |
|---|---|---|---|
| 6,256,125 B1 * | 7/2001 | Uehara | H04J 14/0212 398/79 |
| 2001/0009465 A1 | 7/2001 | Uehara | |
| 2012/0201536 A1 | 8/2012 | Liu et al. | |

FOREIGN PATENT DOCUMENTS

| | | |
|---|---|---|
| CN | 1728608 A | 2/2006 |
| CN | 101610129 A | 12/2009 |

(Continued)

OTHER PUBLICATIONS

Communication dated Sep. 29, 2015 from the Japanese Patent Office in counterpart application No. 2014-538166.

(Continued)

*Primary Examiner* — Darren E Wolf
(74) *Attorney, Agent, or Firm* — Sughrue Mion, PLLC (57) ABSTRACT

In order to add a CDC function to a ROADM system currently incompatible with CDC, without requiring any service outage, an optical communication system of the present invention includes: an optical demultiplexing unit 1-1 and 1-2 which each demultiplexes a wavelength-multiplexed optical signal inputted thereto and an optical multiplexing unit 2-1 and 2-2 which each multiplexes together some of, specifically at least two or more of, the components of the wavelength-multiplexed optical signal having been demultiplexed by the optical demultiplexing unit 1-1 or 1-2; and an optical path selection unit 3 which selectively outputs either the optical signal multiplexed by the optical multiplexing unit 2-1 or that by the optical multiplexing unit 2-2, in a form of at least two or more output optical signals.

8 Claims, 10 Drawing Sheets

(56) References Cited

FOREIGN PATENT DOCUMENTS

| CN | 102696194 A | 9/2012 |
|---|---|---|
| JP | 2006-086920 A | 3/2006 |
| JP | 2010-074565 A | 4/2010 |
| JP | 2012-065292 A | 3/2012 |
| JP | 2012-114640 A | 6/2012 |
| KR | 10-2008-0092803 A | 10/2008 |

OTHER PUBLICATIONS

International Search Report for PCT/JP2013/005608 dated Nov. 5, 2013.
Communication dated Jun. 1, 2016 from the State Intellectual Property Office of the P.R.C. issued in corresponding Application No. 201380050654.9.
Xinquan Zhang et al., "Study on technology and implementation of ROADM", Optical Communication Technology, China Academic Journal Electronic Publishing House, Jan. 8, 2007, pp. 32-34, 3 pages total.
Gangxiang Shen et al., "How Much Can Colorless, Directionless and Contentionless (CDC) of ROADM Help Dynamic Lightpath Provisioning?" Optical Fiber Communication Conference and Exposition, Mar. 8, 2012, pp. 1-2, 3 pages total.
Tomoyuki Hino et al., "Silicon Photonics Based Transponder Aggregator for Next Generation ROADM Systems", 2012 38th European Conference and Exhibition on Optical Communication, Sep. 20, 2012, pp. 1-3.
Manish Sharma et al., "Next-Generation ROADM Technologies and Architecture", Proc. of SPIE vol. 8283, Jan. 21, 2012 pp. 828309-1 to 828309-9.

* cited by examiner

OPTICAL BRANCHING/COUPLING DEVICE AND OPTICAL BRANCHING/COUPLING METHOD

CROSS REFERENCE TO RELATED APPLICATIONS

This application is a National Stage of International Application No. PCT/JP2013/005608 filed Sep. 24, 2013, claiming priority based on Japanese Patent Application No. 2012-213922 filed Sep. 27, 2012, the contents of all of which are incorporated herein by reference in their entirety.

TECHNICAL FIELD

The present invention relates to an optical branching/coupling device and an optical branching/coupling method, which are used in an Reconfigurable Optical Add/Drop Multiplexing (ROADM) optical communication system.

BACKGROUND ART

An ROADM system is widely used in wavelength division multiplexing (WDM) optical communication. In the ROADM system, branching and coupling of wavelength-multiplexed optical signals are performed by the use of an optical branching/coupling device or the like.

Figure 10:
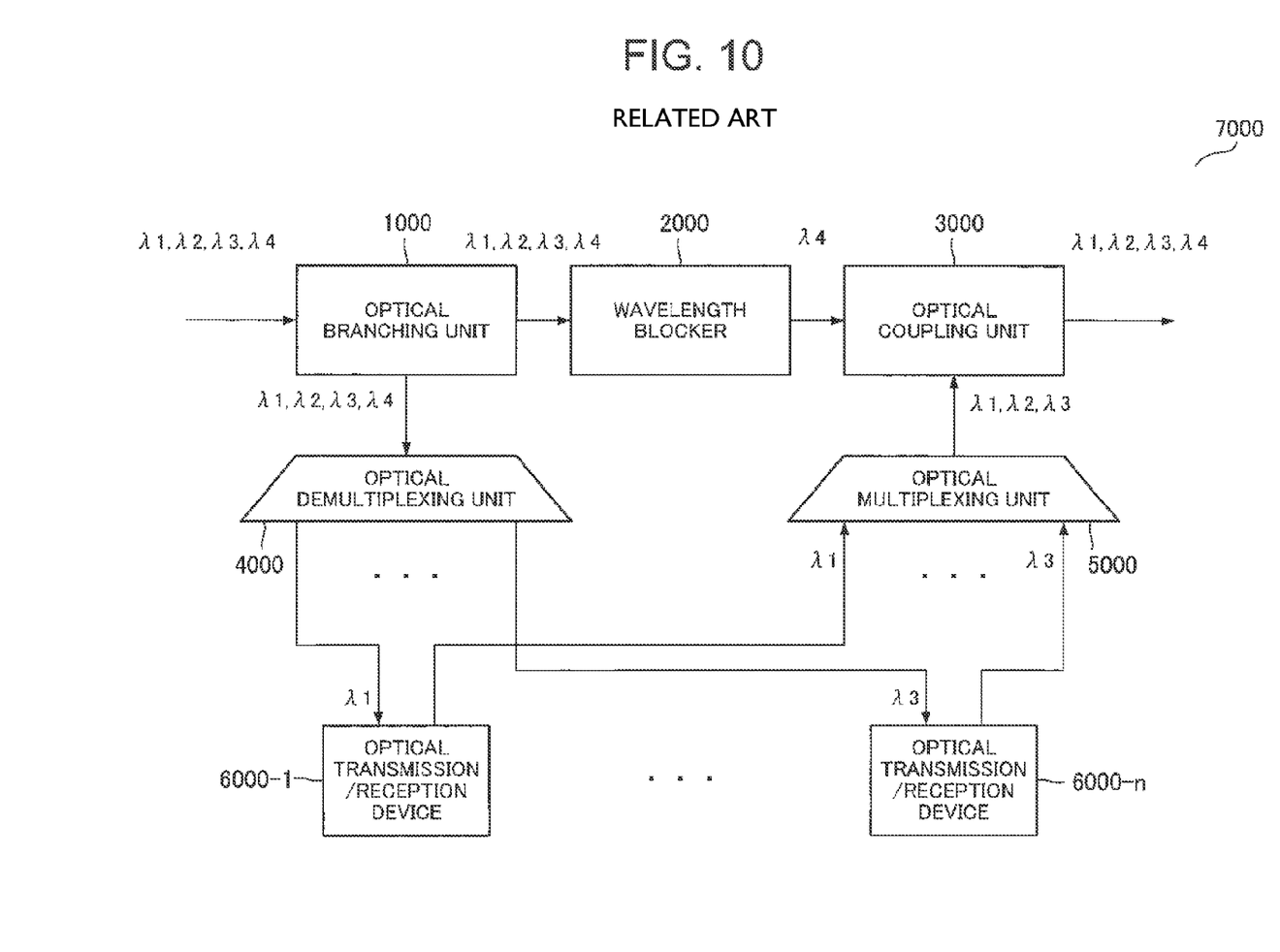

FIG. 10 is a diagram showing a configuration of a general ROADM system 7000. In the ROADM system 7000, an optical branching unit 1000 branches an optical signal received from an upstream transmission line, and an optical demultiplexing unit 4000 demultiplexes the branching optical signal. As a result, optical transmission/reception devices 6000-1 to 6000-$n$ each receives only an optical signal of required wavelength. Optical signals transmitted from respectively the optical transmission/reception devices 6000-1 to 6000-$n$ are multiplexed together at an optical multiplexing unit 5000, and the multiplexed optical signal is transmitted to an optical coupling unit 3000. A wavelength blocker 2000 eliminates, from an optical signal inputted to wavelength blocker 2000 from the optical branching unit 1000, optical signal components of the same wavelengths as those for optical signals transmitted or received by the optical transmission/reception devices 6000-1 to 6000-$n$, and outputs the resultant optical signal to the optical coupling unit 3000. The optical coupling unit 3000 multiplexes the optical signal from the wavelength blocker 2000 with the optical signal from the optical multiplexing unit 5000, and outputs the multiplexed optical signal.

In recent years, as a result of Color-less Direction-less Contention-less (CDC)-ROADM technology being put into practical use, application of CDC to existing networks has been advanced. A CDC-ROADM system is an ROADM system capable of performing add/drop of optical signals without generating any contention between the optical signals, even when they have any wavelengths or any routes. The CDC function is realized by solving the dependency of a wavelength multiplexing/demultiplexing unit on route and wavelength.

A configuration of a general CDC-ROADM system is described in Patent Literature 1 (PTL 1). The CDC-ROADM system described in PTL 1 realizes the CDC function by the use of a plurality of Wavelength Selective Switches (WSSs), optical couplers and cross-connect switches.

CITATION LIST

Patent Literature

[PTL 1] Japanese Patent Application Laid-Open No. 2012-114640

SUMMARY OF INVENTION

Technical Problem

However, when applying the CDC-ROADM system described in PTL 1 to an existing ROADM system, replacement of a wavelength multiplexing/demultiplexing unit used there is required. That is, it is impossible to add the CDC function to an existing ROADM system without halting the ROADM system, and accordingly, it is impossible to add the CDC function to the ROADM system in an in-service state.

The objective of the present invention is to provide an optical branching/coupling device and an optical branching/coupling method, both of which enable adding the CDC function to an ROADM system currently incompatible with CDC, without requiring any service outage.

Solution to Problem

An optical branching/coupling device of the present invention includes: a first optical demultiplexing means which demultiplexes a first wavelength-multiplexed optical signal inputted to the first optical demultiplexing means into optical signals of respective wavelengths; a first optical multiplexing means which multiplexes together some of the demultiplexed optical signals produced by the first optical demultiplexing means; a second optical demultiplexing means which demultiplexes a second wavelength-multiplexed optical signal inputted to the second optical demultiplexing means into optical signals of respective wavelengths; a second optical multiplexing means which multiplexes together some of the demultiplexed optical signals produced by the second optical demultiplexing means; and an optical path selection means which selectively outputs either the multiplexed optical signal produced by the first optical multiplexing means or the multiplexed optical signal produced by the second optical multiplexing means, in a form of two or more output optical signals.

An optical branching/coupling method of the present invention includes: demultiplexing an inputted first wavelength-multiplexed optical signal into optical signals of respective wavelengths, and multiplexing together some of the optical signals produced by the demultiplexing; demultiplexing an inputted second wavelength-multiplexed optical signal into optical signals of respective wavelengths, and multiplexing together some of the optical signals produced by the demultiplexing; and selectively outputting, in a form of output optical signals, either the first wavelength-multiplexed optical signal having experienced the demultiplexing and subsequent multiplexing or the second wavelength-multiplexed optical signal having experienced the demultiplexing and subsequent multiplexing.

Advantageous Effects of Invention

The optical branching/coupling device and the optical branching/coupling method, of the present invention, can add the CDC function to an ROADM system currently incompatible with CDC, without requiring any service outage.

DESCRIPTION OF EMBODIMENTS

First Exemplary Embodiment

Figure 1:
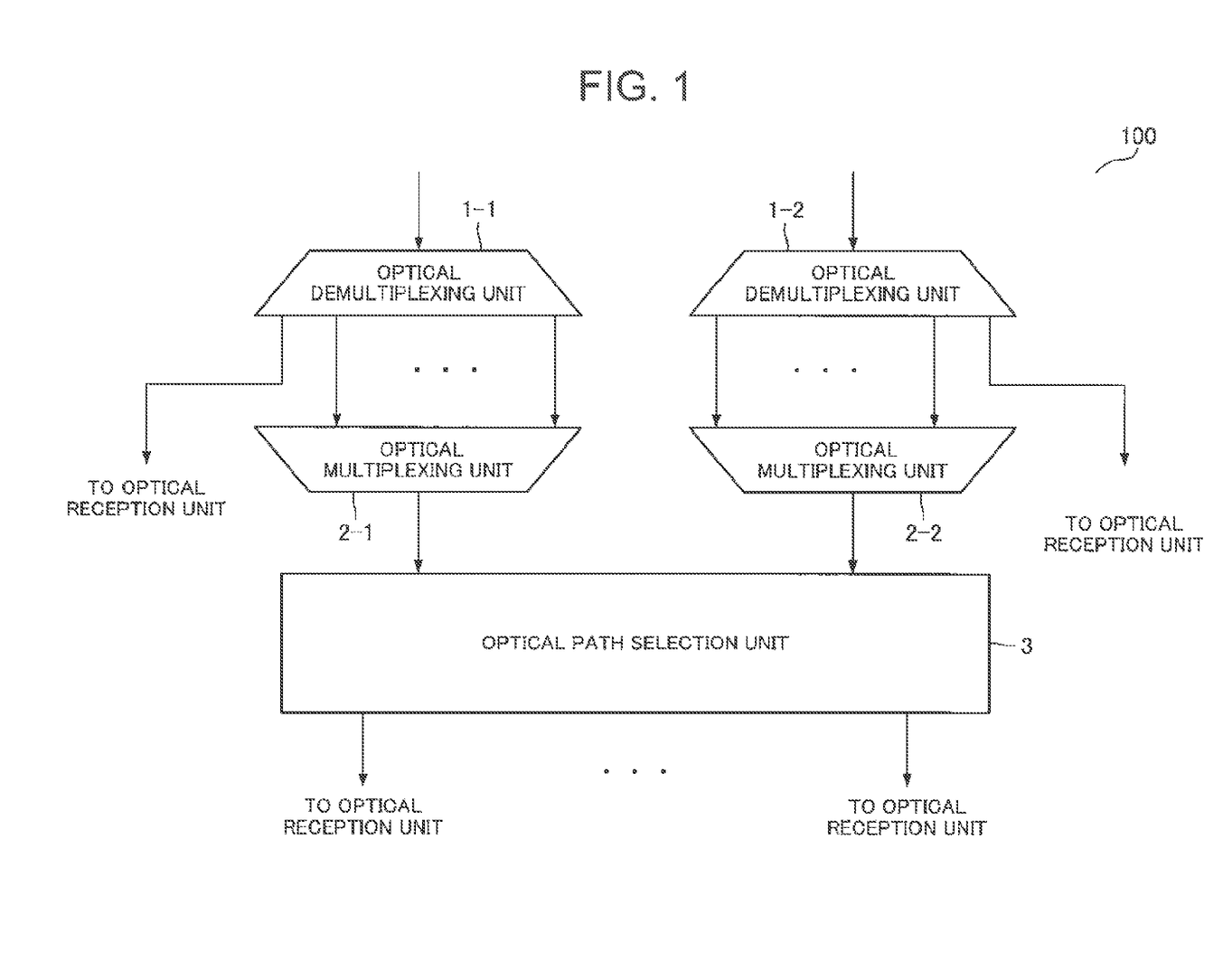
FIG. 1 A block diagram showing a configuration of an optical branching/coupling device 100 of a first exemplary embodiment of the present invention FIG. 2 A flow chart showing operation of the optical branching/coupling device 100 of the first exemplary embodiment of the present invention FIG. 3 A block diagram showing a configuration of an optical branching/coupling device 100a of a second exemplary embodiment of the present invention FIG. 4 A block diagram showing a detailed configuration of an optical path selection unit 30 in the optical branching/coupling device 100a of the second exemplary embodiment of the present invention FIG. 5 A block diagram showing a detailed configuration of optical reception units 40-3 to 40-n in the optical branching/coupling device 100a of the second exemplary embodiment of the present invention FIG. 6 A flow chart showing operation of the optical branching/coupling device 100a of the second exemplary embodiment of the present invention FIG. 7 A block diagram showing a configuration of an optical branching/coupling device 100b of a third exemplary embodiment of the present invention FIG. 8 A block diagram showing a configuration of an optical branching/coupling device 100c of a fourth exemplary embodiment of the present invention FIG. 9 A diagram showing a configuration of an optical communication system of a fifth exemplary embodiment of the present invention FIG. 10 A diagram showing a configuration of a general ROADM optical communication system

A first embodiment of the present invention will be described in detail, with reference to drawings. FIG. 1 is a block diagram showing a configuration of an optical branching/coupling device 100 of the first exemplary embodiment of the present invention. The optical branching/coupling device 100 includes an optical demultiplexing unit 1-1 which demultiplexes an wavelength-multiplexed optical signal inputted to the optical demultiplexing unit 1-1 into optical signals of respective wavelengths, and an optical multiplexing unit 2-1 which multiplexes together some of the optical signals produced by the demultiplexing by the optical demultiplexing unit 1-1. The optical branching/coupling device 100 also includes an optical demultiplexing unit 1-2 which demultiplexes an wavelength-multiplexed optical signal inputted to the optical demultiplexing unit 1-2 into optical signals of respective wavelengths, and an optical multiplexing unit 2-2 which multiplexes together some of the optical signals produced by the demultiplexing by the optical demultiplexing unit 1-2. The optical branching/coupling device 100 further includes an optical path selection unit 3 which selectively outputs either the multiplexed optical signal produced by the optical multiplexing unit 2-1 or that produced by the optical multiplexing unit 2-2, in a form of at least two or more output optical signals.

Figure 2:
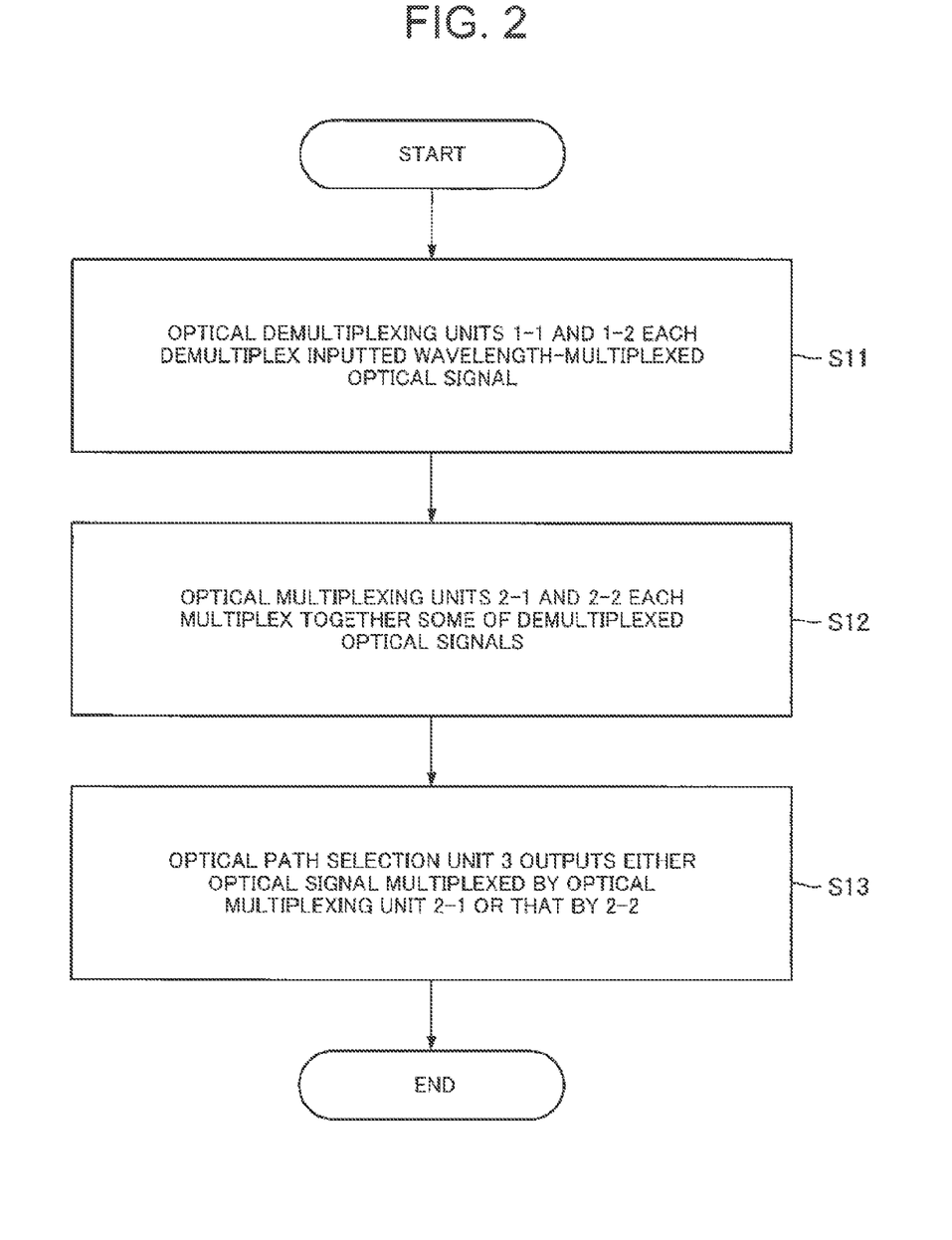

Next, operation of the optical branching/coupling device 100 will be described. FIG. 2 is a flow chart showing the operation of the optical branching/coupling device 100. Each of the optical demultiplexing units 1-1 and 1-2 demultiplexes a wavelength-multiplexed optical signal inputted thereto into a plurality of optical signals (step S11). At that time, some of the optical signals produced by the demultiplexing are outputted to optical reception units. Next, the optical multiplexing unit 2-1 multiplexes together some of the plurality of optical signals produced by the demultiplexing by the optical demultiplexing unit 1-1, and the multiplexing unit 2-2 multiplexes together some of the plurality of optical signals produced by the demultiplexing by the optical multiplexing unit 1-2 (step S12). Then, the optical path selection unit 3 outputs either the multiplexed optical signal produced by the multiplexing unit 2-1 or that produced by the multiplexing unit 2-2, in a form of a plurality of output optical signals (step S13). At that time, the plurality of output optical signals outputted by the optical path selection unit 3 are directed to optical reception units or the like.

Thus, the optical branching/coupling device 100 includes the optical demultiplexing units 1-1 which demultiplexes a wavelength-multiplexed optical signal inputted to the optical demultiplexing units 1-1 into optical signals of respective wavelengths, and optical multiplexing units 2-1 which multiplexes some of the demultiplexed optical signals produced by the optical demultiplexing units 1-1. It accordingly becomes possible that, at a stage prior to optical path selection performed by the optical path selection unit 3, optical signals of some wavelengths, among the demultiplexed optical signals produced by the optical demultiplexing units 1-1 and 1-2, are made to be optical signals on a line physically different from that for optical signals of the other wavelengths. As a result, even when adding the CDC function to the optical branching/coupling device currently incompatible with CDC, it is only necessary, for example, to replace components arranged at stages after the optical multiplexing units 2-1 and 2-2, and it accordingly is not required to replace the whole device including the optical demultiplexing units 1-1 and 1-2. Therefore, the optical branching/coupling device 100 can add the CDC function without requiring any service outage.

Here, the optical branching/coupling device 100 may further include a CPU (central processing unit) and a memory storing a program. Accordingly, the procedure from the step S11 to the step S13 illustrated in FIG. 2 may be realized by causing the CPU to execute the program stored in the memory.

Second Exemplary Embodiment

Figure 3:
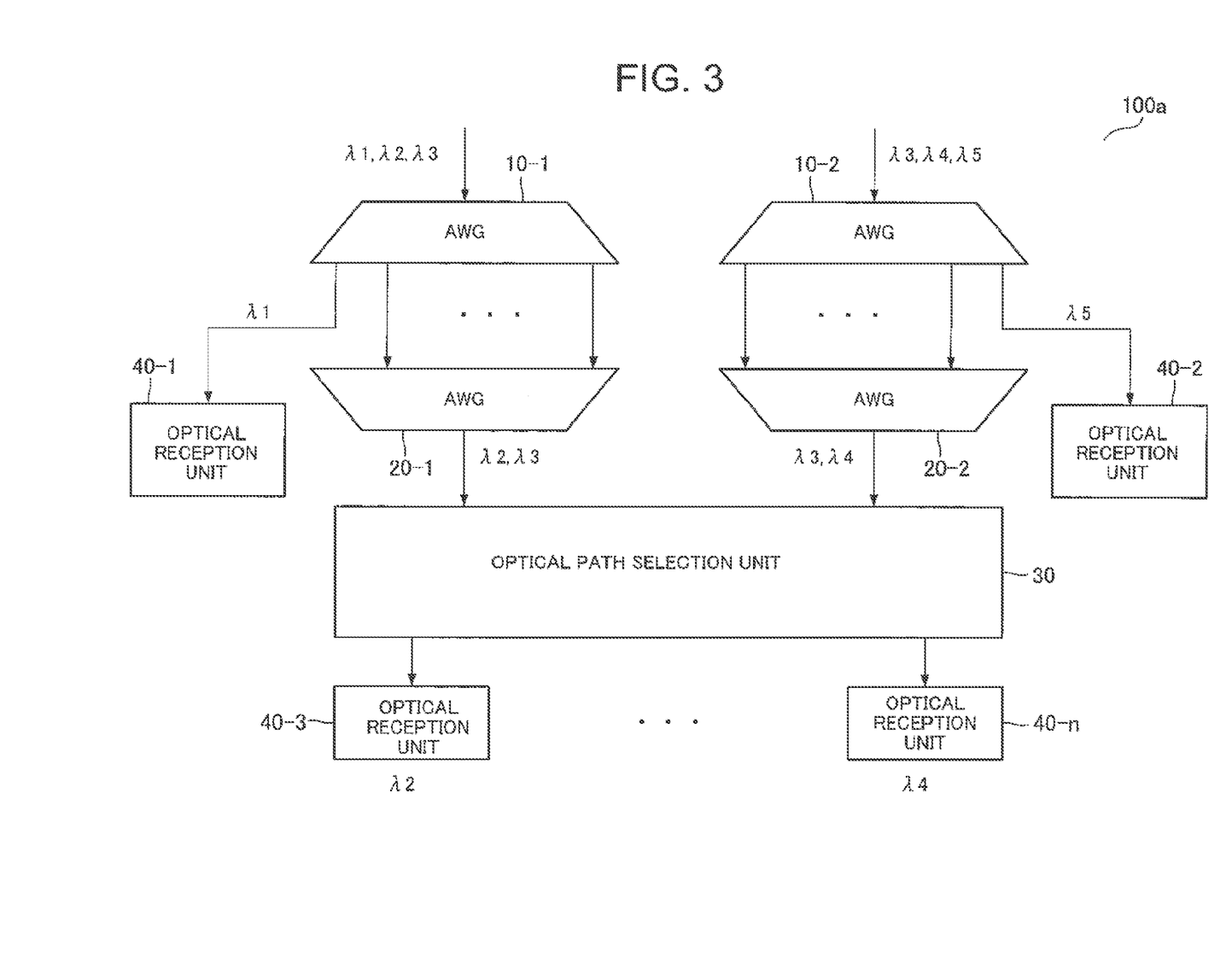

Next, a second exemplary embodiment of the present invention will be described. FIG. 3 is a block diagram showing a configuration of an optical branching/coupling device 100a of the second exemplary embodiment. As shown in FIG. 3, the optical branching/coupling device 100a includes AWGs (Arrayed Waveguide Gratings) 10-1, 10-2, 20-1 and 20-2, an optical path selection unit 30 and optical reception units 40-1 to 40-n.

Here, the AWGs 10-1 and 10-2 correspond, respectively, to the optical demultiplexing units 1-1 and 1-2 in FIG. 1, and the AWGs 20-1 and 20-2, respectively, to the optical multiplexing units 2-1 and 2-2.

Figure 4:
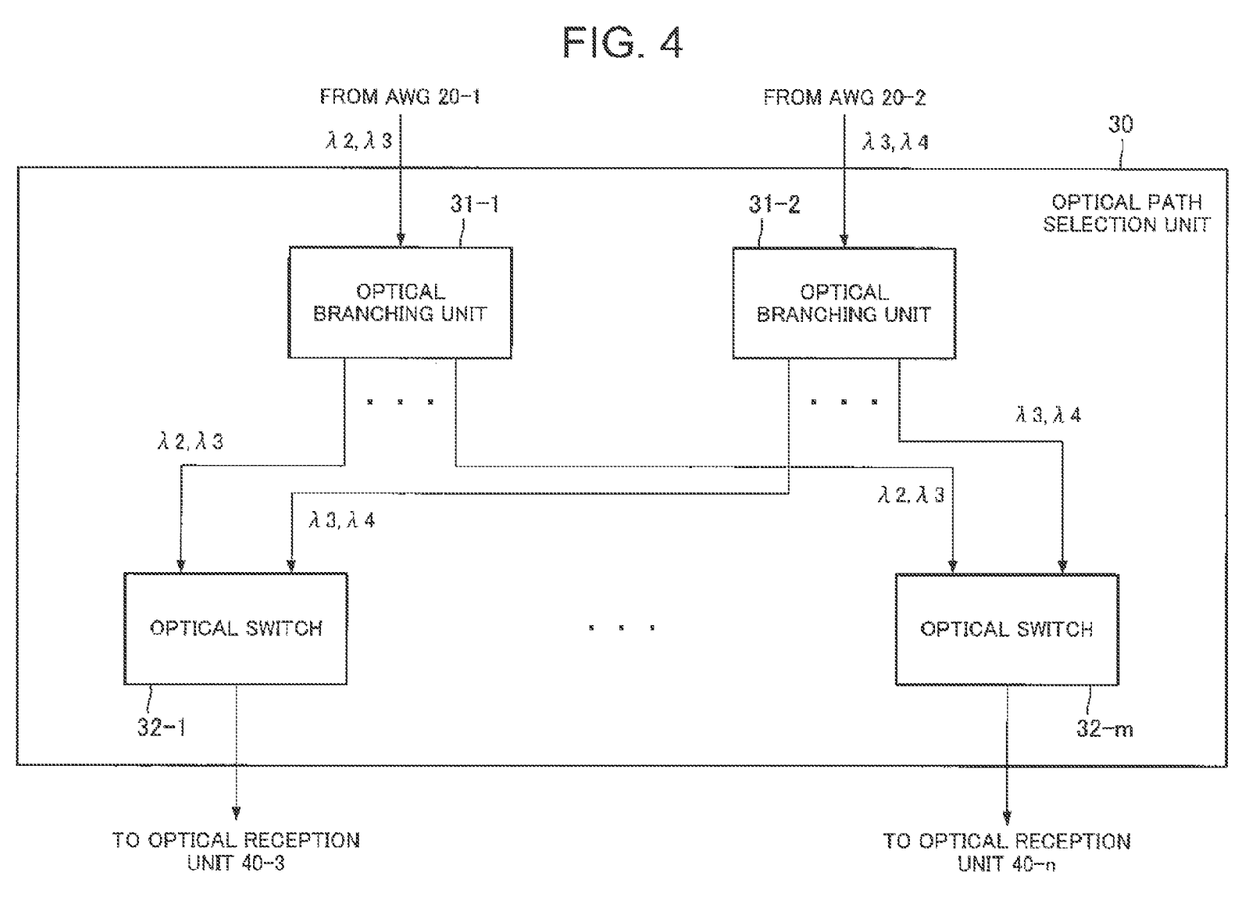

FIG. 4 is a block diagram showing a detailed configuration of the optical path selection unit 30 included in the optical branching/coupling device 100a. As shown in FIG. 4, the optical path selection unit 30 includes optical branching units 31-1 and 31-2 and optical switches 32-1 to 32-m. Here, the optical branching units 31-1 and 31-2 are optical couplers or the like, and the optical switches 32-1 to 32-m are switches each of which mechanically switches an optical path, micro electro mechanical systems (MEMS) switches or the like.

Figure 5:
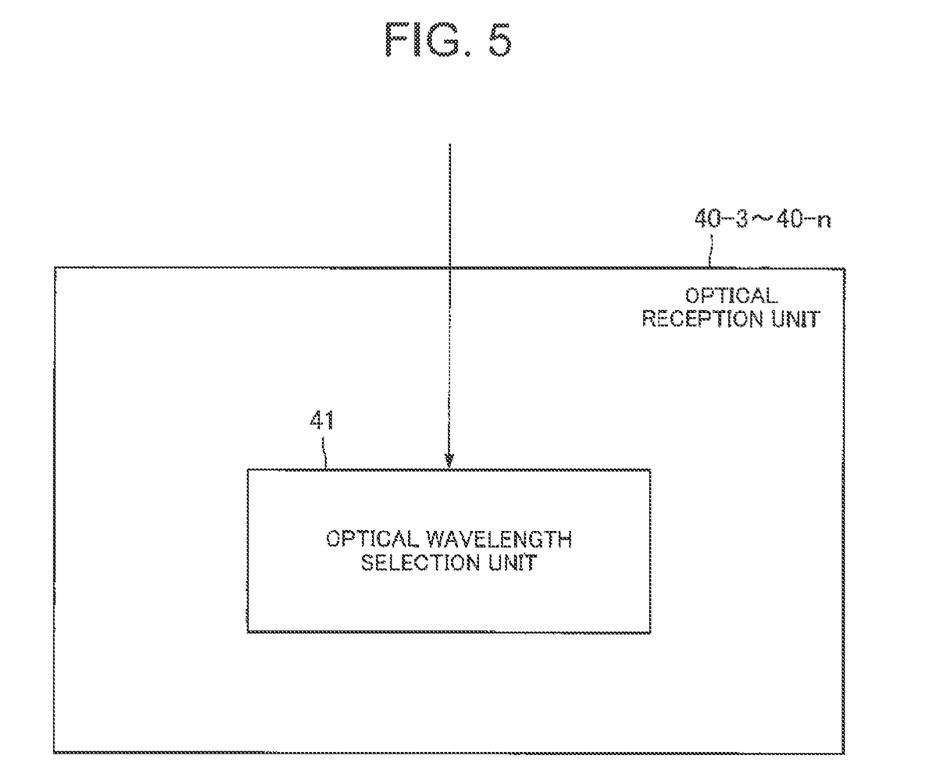

FIG. 5 is a block diagram showing a detailed configuration of the optical reception units 40-3 to 40-n which are included in the optical branching/coupling device 100a. The optical reception units 40-3 to 40-n each includes an optical wavelength selection unit 41. Here, the light wavelength selection unit 41 is an optical filter which transmits light of a predetermined wavelength and attenuates light of other wavelengths, a digital coherent receiver which performs selective reception by causing a received optical signal to interfere with light of a predetermined wavelength, or the like.

Figure 6:
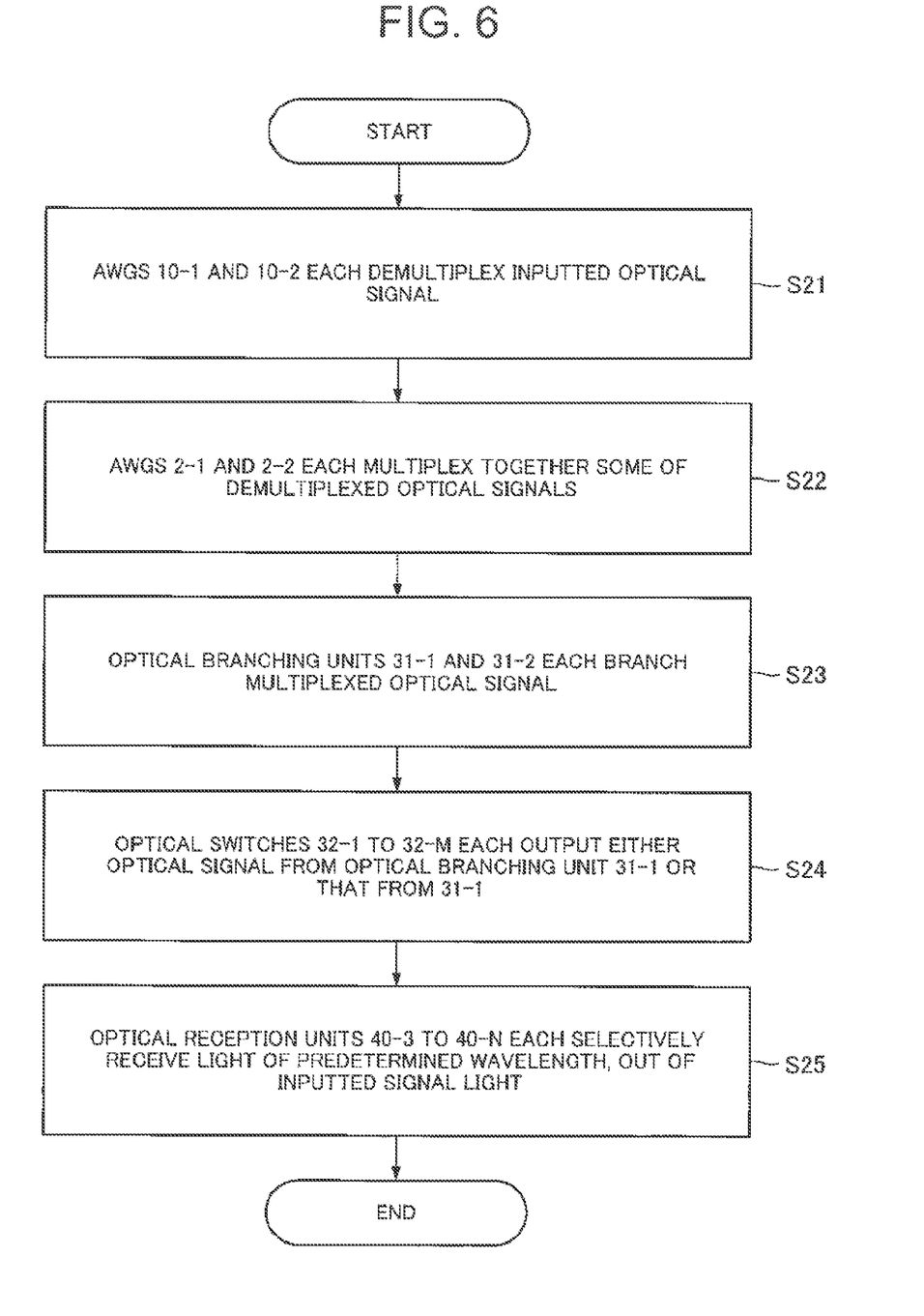

Next, operation of the optical branching/coupling device 100a will be described. FIG. 6 is a flow chart showing the operation of the optical branching/coupling device 100a of the present exemplary embodiment. The following description with reference to FIG. 6 will be given of a case where, in FIGS. 3 and 4, a wavelength-multiplexed optical signal including λ1, λ2 and λ3 and a wavelength-multiplexed optical signal including λ3, λ4 and λ5 are inputted.

The AWGs 10-1 and 10-2 demultiplex respective ones of the inputted wavelength-multiplexed optical signals into a plurality of optical signals (step S21). At that time, some of the demultiplexed optical signals (λ1 and λ5) are outputted to respective ones of the optical reception units 40-1 and 40-2. Next, the AWG 20-1 multiplexes together some of the plurality of demultiplexed optical signals produced by the AWG 10-1 (λ2 and λ3), and the AWG 20-2 multiplexes together some of the plurality of demultiplexed optical signals produced by the AWG 10-2 (λ3 and λ4) (step S22).

The optical branching units 31-1 and 31-2 branches, respectively, the optical signal from the AWG 20-1 and that from the AWG 20-2 (step S23). Then, each of the optical switches 32-1 to 32-m selectively outputs either of optical signals received respectively from the optical branching units 31-1 and 31-2 (λ2 and λ3, or λ3 and λ4) to the corresponding one of the optical reception units 40-3 to 40-n (step S24).

The optical reception units 40-3 to 40-n each receive the optical signal from the corresponding one of the optical switches 32-1 to 32-m (step S25). At that time, the light wavelength selection unit 41 selectively extracts light of a predetermined wavelength to be received by the corresponding one of the optical reception units 40-3 to 40-n in which it is included (for example, light of λ2 is extracted in the optical reception unit 40-3 of FIG. 3).

The optical branching/coupling device 100a of the second exemplary embodiment includes the optical reception units 40-1 and 40-2 in addition to the configuration of the optical branching/coupling device 100 of the first exemplary embodiment. As a result, in addition to exhibiting the same effect as the first exemplary embodiment does, the optical branching/coupling device 100a can receive optical signals of some wavelengths, among the demultiplexed optical signals produced by the optical demultiplexing units 1-1 and 1-2, as optical signals on a line physically different from that for optical signals of the other wavelengths, at a stage prior to optical path selection performed by the optical path selection unit 30.

Also in addition to the configuration of the optical branching/coupling device 100 of the first exemplary embodiment, the optical branching/coupling device 100a of the second exemplary embodiment further includes the optical reception units 40-3 to 40-n each having the optical wavelength selection unit 41 which receives only an optical signal of a predetermined wavelength among output optical signals. Accordingly, the optical branching/coupling device 100a further can select the wavelength of an optical signal to be received by each of the optical reception units 40-3 to 40-n. As a result, the optical branching/coupling device 100a can selectively receive an optical signal of a specific wavelength at each of the optical reception units 40-3 to 40-n. Preferably, a digital coherent receiver is used for each of the optical wavelength selection units 41, and accordingly, the optical branching/coupling device 100a can receive higher-speed signals.

Here, in such a case where a digital coherent receiver is applied to each of the optical wavelength selection units 41, the wavelength of an optical signal to be received by each of the optical wavelength selection units 41 can be changed by adding to the optical wavelength selection unit 41 a local selection function of making variable the wavelength of light to interfere with inputted optical signals.

Third Exemplary Embodiment

Figure 7:
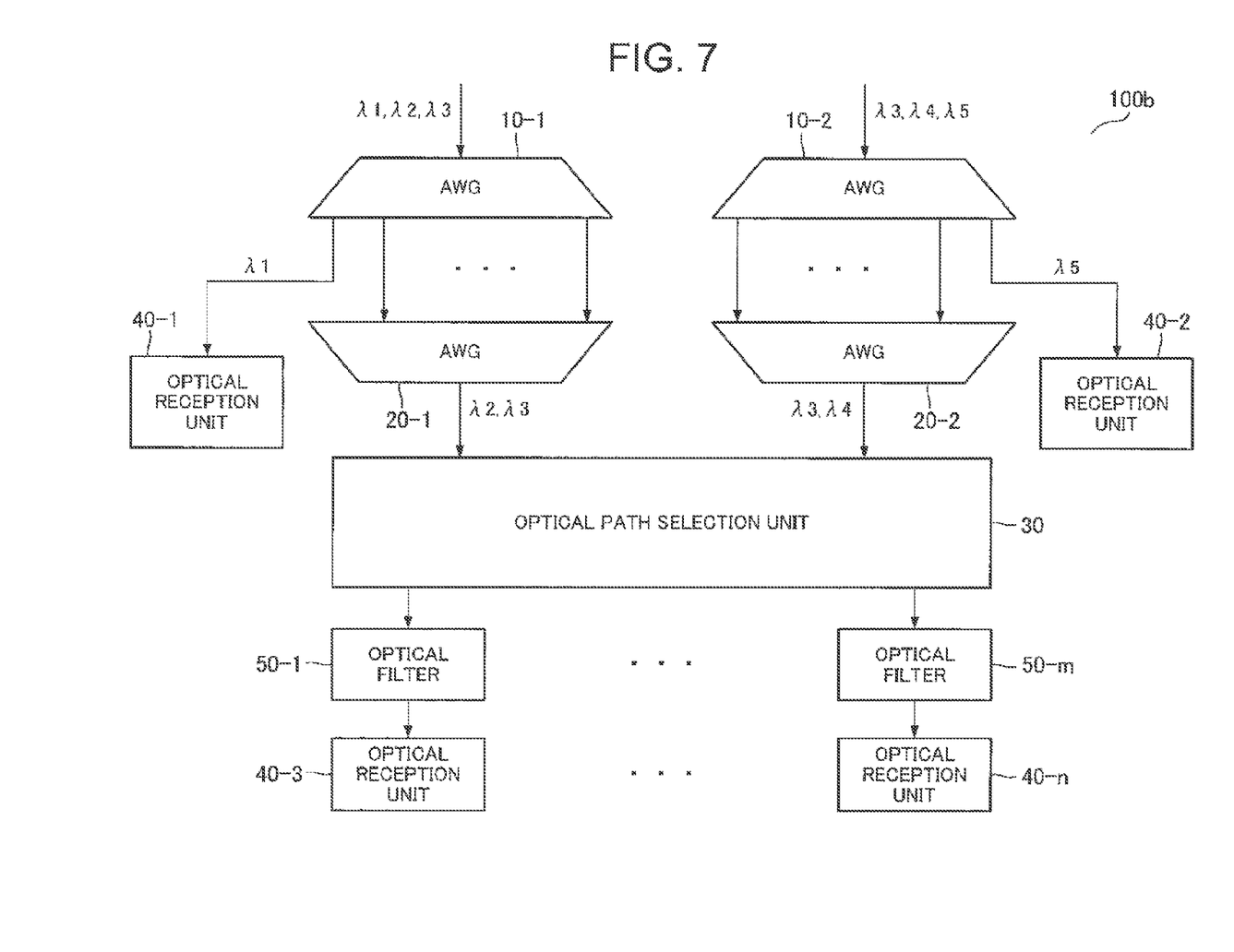

Next, a third exemplary embodiment of the present invention will be described. FIG. 7 is a block diagram showing a configuration of an optical branching/coupling device 100b of the third exemplary embodiment. The configuration of the optical branching/coupling device 100b is different from that of the optical branching/coupling device 100a of the second exemplary embodiment shown in FIGS. 3 and 4 in that optical filters 50-1 to 50-m are provided between the optical path selection unit 30 and the optical reception units 40-3 to 40-n. Each of the optical filters 50-1 to 50-m transmits only light of a predetermined wavelength and attenuates light of other wavelengths.

Because the optical branching/coupling device 100b accordingly can extract an optical signal of a predetermined wavelength by means of each of the optical filters 50-1 to 50-m, it is not necessary for the optical reception units 40-3 to 40-n to have a function of wavelength-selective reception. As a result, in addition to exhibiting the same effect as the first exemplary embodiment does, the optical branching/coupling device 100b can use an existing optical receiver module as each of the optical reception units 40-3 to 40-n. Further, by making variable the filtering wavelength of each of the optical filters 50-1 to 50-m, it also becomes possible to change the wavelength of an optical signal to be received by each of the optical reception units 40-3 to 40-n.

Fourth Exemplary Embodiment

In the first to third exemplary embodiments described above, the descriptions have been given of the cases where the respective optical branching/coupling devices are each used as a part of a reception system. However, an optical branching/coupling device having a similar configuration may be applied to a transmission system.

Figure 8:
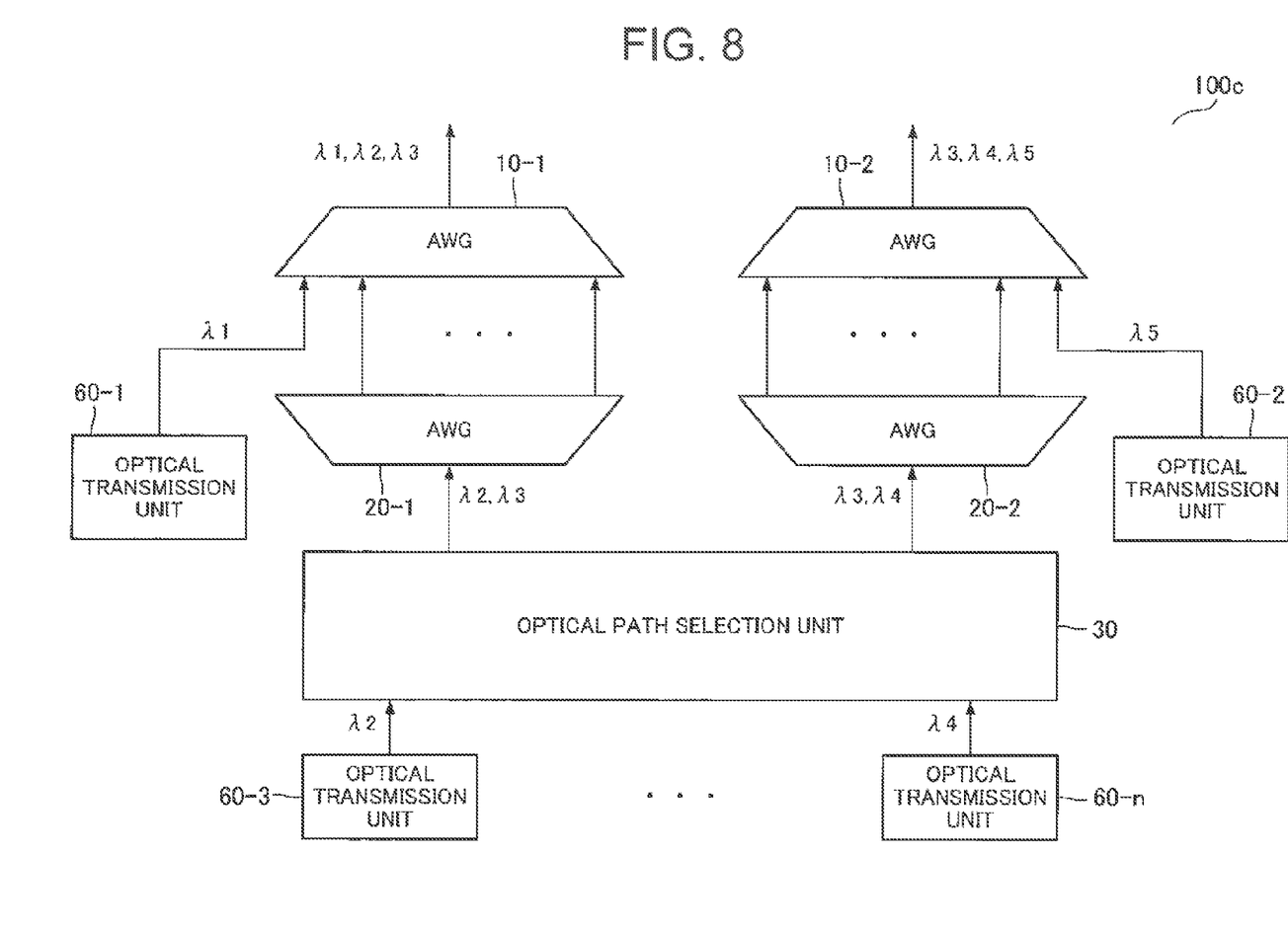

FIG. 8 is a block diagram showing a configuration of an optical branching/coupling device 100c of a fourth exemplary embodiment. The configuration of the optical branching/coupling device 100c shows a configuration in a case the optical branching/coupling device 100a of the second exemplary embodiment is applied to a transmission system.

The basic configuration of the optical branching/coupling device 100c in the present exemplary embodiment is similar to the optical branching/coupling device 100a shown in FIG. 3, but different from the optical branching/coupling device 100a in that the optical reception units 40-1 to 40-n are replaced by optical transmission units 60-1 to 60-n.

In the optical branching/coupling device 100c, the optical transmission units 60-3 to 60-n each output an optical signal including a predetermined wavelength to the optical path selection unit 30. The optical path selection unit 30 selectively multiplexes together the optical signals transmitted from, respectively, the optical transmission units 60-3 to 60-n, and outputs the multiplexed signal to the AWG 20-1 or the AWG 20-2. The AWGs 20-1 and 20-2 each demultiplexes the inputted signal. Then, the AWGs 10-1 and 10-2 each multiplexes the corresponding ones of the demultiplexed optical signals produced by the AWGs 20-1 and 20-2 with the corresponding one of the optical signals outputted from the optical transmission units 60-1 and 60-2, and output the multiplexed optical signal.

The optical branching/coupling device 100c having such a configuration can transmit optical signals of some wavelengths as signals on a line physically different from that for optical signals of other wavelengths, at a stage prior to optical path selection performed by the optical path selection unit 30. As a result, even when adding the CDC function to the optical branching/coupling device currently incompatible with CDC, it is only necessary, for example, to replace components illustrated in an area of FIG. 8 on the side of the optical transmission units 60-3 to 60-n ranging from the AWGs 20-1 and 20-2, and it accordingly is not required to replace the whole device including the AWG 10-1 and 10-2. Therefore, the optical branching/coupling device 100c of the fourth exemplary embodiment can exhibit, in a transmission system, the effect that the CDC function can be added without requiring any service outage, similarly to the optical branching/coupling devices of the first to third exemplary embodiments.

Fifth Exemplary Embodiment

Figure 9:
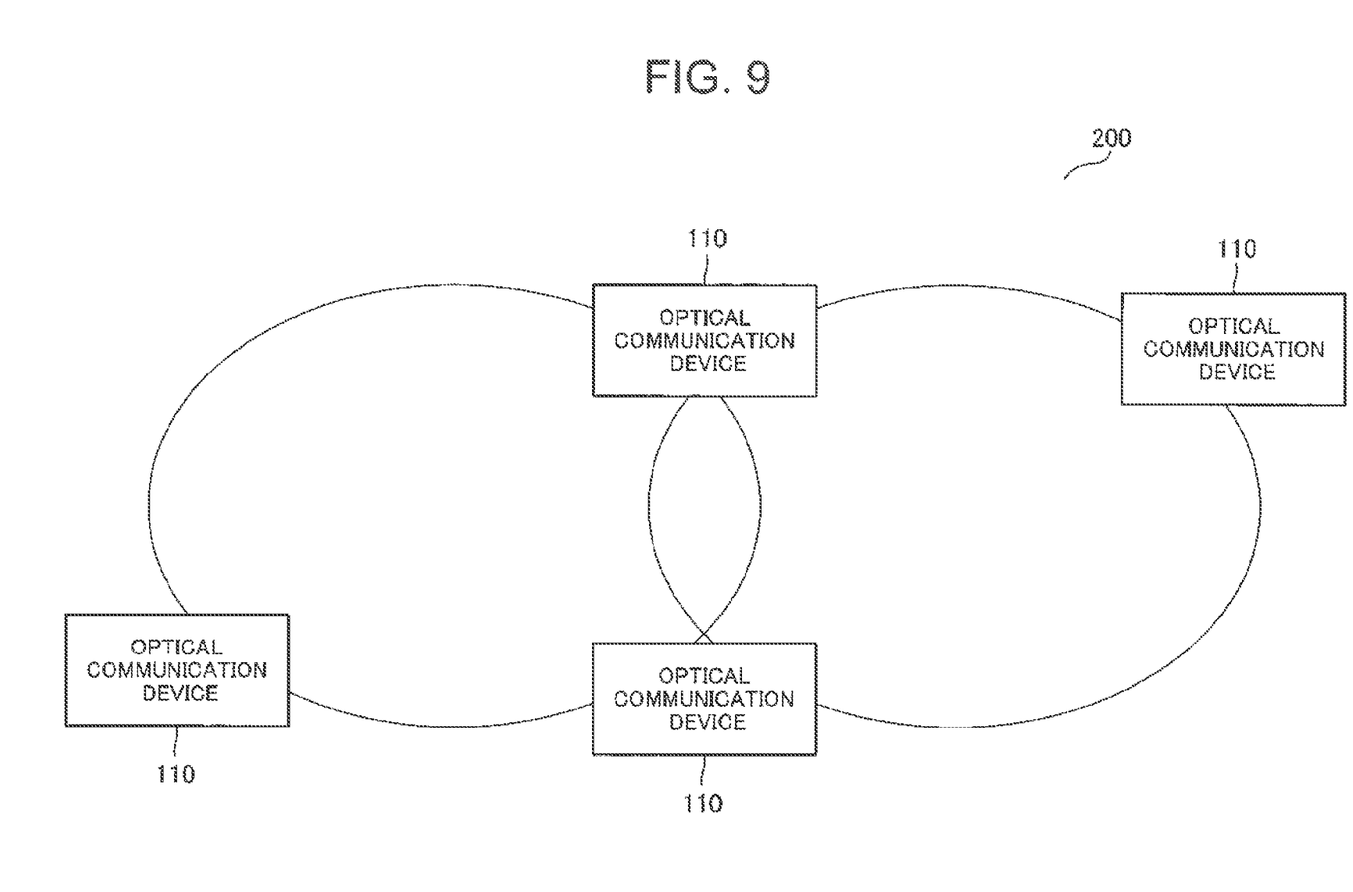

Further, by arranging a plurality of optical branching/coupling devices according to any of the first to fourth exemplary embodiments, an optical communication system can be constructed. FIG. 9 is a diagram showing a configuration of an optical communication system 200 of a fifth exemplary embodiment.

The optical communication system 200 includes a plurality of optical communication devices 110. In the optical communication system 200, connections between the optical communication devices 110 are made using optical fibers or the like, and a WDM communication network is thereby built.

Each of the optical communication devices 110 comprises an optical coupler and the optical branching/coupling device 100 of the first exemplary embodiment. In each of the optical communication devices 110, an optical signal transmitted in the WDM communication network is branched by the optical coupler or the like, and the branched wavelength-multiplexed optical signal is inputted to the optical branching/coupling device 100. In this way, the optical communication devices 110 each function as a node of a ROADM system.

The present invention has been described above with reference to the exemplary embodiments, but the present invention is not limited to the above-described exemplary embodiments. In the configurations and the details of the present invention, various changes understandable to those skilled in the art may be made within the scope of the present invention.

This application is based upon and claims the benefit of priority from Japanese Patent Application No. 2012-213922, filed on Sep. 27, 2012, the disclosure of which is incorporated herein in its entirety by reference.

Other Expressions of Exemplary Embodiment

Part or the whole of the exemplary embodiments described above may also be described as, but not limited to, the following supplementary notes.

(Supplementary Note 1)

An optical branching/coupling device comprising:
a first optical demultiplexing unit which demultiplexes a first wavelength-multiplexed optical signal inputted to the first optical demultiplexing unit into optical signals of respective wavelengths;
a first optical multiplexing unit which multiplexes together some of the demultiplexed optical signals produced by the first optical demultiplexing unit;
a second optical demultiplexing unit which demultiplexes a second wavelength-multiplexed optical signal inputted to the second optical demultiplexing unit into optical signals of respective wavelengths;
a second optical multiplexing unit which multiplexes together some of the demultiplexed optical signals produced by the second optical demultiplexing unit; and
an optical path selection unit which selectively outputs either a multiplexed optical signal produced by the first optical multiplexing unit or a multiplexed optical signal produced by the second optical multiplexing unit, in a form of two or more output optical signals.

(Supplementary Note 2)

The optical branching/coupling device according to supplementary note 1, further comprising:
a first optical reception unit which receives an optical signal other than an optical signal to be inputted to the first optical multiplexing unit, among the demultiplexed optical signals produced by the first optical demultiplexing unit; and
a second optical reception unit which receives an optical signal other than an optical signal to be inputted to the second optical multiplexing unit, among the demultiplexed optical signals produced by the second optical demultiplexing unit.

(Supplementary Note 3)

The optical branching/coupling device according to supplementary notes 1 or 2, wherein
the optical path selection unit includes:
a first optical branching unit which branches the multiplexed optical signal produced by the first optical multiplexing unit;
a second optical branching unit which branches the multiplexed optical signal produced by the second optical multiplexing unit; and
two or more optical switches which each selectively output either a multiplexed optical signal produced by the first optical multiplexing unit or a multiplexed optical signal produced by the second optical multiplexing unit, as each of the output optical signals.

(Supplementary Note 4)

The optical branching/coupling device according to any one of supplementary notes 1 to 3, further comprising
a third optical reception unit which receives one of the output optical signals from the optical path selection unit, wherein
the third optical reception unit has an optical wavelength selection unit which receives only an optical signal component of a predetermined wavelength among those included in the output optical signal.

(Supplementary Note 5)

The optical branching/coupling device according to supplementary note 4, wherein the third optical reception unit has a digital coherent optical receiver including a local selection function to select a wavelength to receive.

(Supplementary Note 6)

The optical branching/coupling device according to any one of supplementary notes 1 to 5, further comprising a wavelength filter which transmits only an optical signal component of a predetermined wavelength among those included in the output optical signal from the optical path selection unit.

(Supplementary Note 7)

The optical branching/coupling device according to supplementary note 6, wherein the wavelength filter is a variable wavelength filter.

(Supplementary Note 8)

An optical communication system formed by connecting two or more optical communication devices with each other, each of the optical communication devices comprising:

an optical branching/coupling device according to any one of supplementary notes 1 to 7; and an optical coupler which branches an optical path connected to a transmission line for transmitting a wavelength-multiplexed optical signal and thereby connects the optical path with the optical branching/coupling device.

(Supplementary Note 9)

An optical branching/coupling method comprising:

demultiplexing an inputted first wavelength-multiplexed optical signal into optical signals of respective wavelengths, and multiplexing together some of the demultiplexed optical signals;

demultiplexing an inputted second wavelength-multiplexed optical signal into optical signals of respective wavelengths, and multiplexing together some of the demultiplexed optical signals; and selectively outputting, in a form of output optical signals, either the first wavelength-multiplexed optical signal having experienced the demultiplexing and subsequent multiplexing or the second wavelength-multiplexed optical signal having experienced the demultiplexing and subsequent multiplexing.

(Supplementary Note 10)

A control program of optical branching/coupling device for causing a computer provided in an optical branching/coupling device to execute steps of:

demultiplexing an inputted first wavelength-multiplexed optical signal into optical signals of respective wavelengths, and multiplexing together some of the demultiplexed optical signals;

demultiplexing an inputted second wavelength-multiplexed optical signal into optical signals of respective wavelengths, and multiplexing together some of the demultiplexed optical signals; and selectively outputting either the first wavelength-multiplexed optical signal having experienced the demultiplexing and subsequent multiplexing or the second wavelength-multiplexed optical signal having experienced the demultiplexing and subsequent multiplexing, as output optical signals.

(Supplementary Note 11)

The optical branching/coupling device according to any one of supplementary notes 1 to 7, further comprising two or more optical transmission units, wherein:

the optical path selection unit multiplexes together two or more optical signals outputted from the optical transmission units, and outputs the multiplexed signal to either the first optical multiplexing unit or the second optical multiplexing unit;

the first and second optical multiplexing units each demultiplexes the optical signal outputted from the optical path selection unit;

the first optical demultiplexing unit multiplexes together optical signals from some of the optical transmission units and from the first optical multiplexing unit, and outputs the multiplexed signal; and the second optical demultiplexing unit multiplexes together optical signals from some of the optical transmission units and from the second optical multiplexing unit, and outputs the multiplexed signal (Supplementary Note 12)

A control program of optical branching/coupling device for causing a computer, which is provided in an optical branching/coupling device comprising: a first optical demultiplexing means which demultiplexes a first wavelength-multiplexed optical signal inputted to the first optical demultiplexing means into optical signals of respective wavelengths; a first optical multiplexing means which multiplexes together some of the demultiplexed optical signals produced by the first optical demultiplexing means; a second optical demultiplexing means which demultiplexes a second wavelength-multiplexed optical signal inputted to the second optical demultiplexing means into optical signals of respective wavelengths; a second optical multiplexing means which multiplexes together some of the demultiplexed optical signals produced by the second optical demultiplexing means; and an optical path selection means which selectively outputs the multiplexed optical signal produced by the first optical multiplexing means and that produced by the second optical multiplexing means, to execute a step of selectively outputting either the multiplexed optical signal produced by the first optical multiplexing means or that produced by the second optical multiplexing means, in a form of two or more output optical signals.

REFERENCE SIGNS LIST 1-1, 1-2 optical demultiplexing unit
2-1, 1-2 optical multiplexing unit
3 optical path selection unit
10-1, 10-2 AWG
20-1, 20-2 AWG
30 optical path selection unit
40-1 to 40-$n$ optical reception unit
31-1, 31-2 optical branching unit
32-1 to 30-$m$ optical switch
41 optical wavelength selection unit
50-1 to 50-$m$ optical filter
60-1 to 60-$n$ optical transmission unit
100, 100$a$, 100$b$, 100$c$ optical branching/coupling device
110 optical communication device
200 optical communication system
1000 optical branching unit
2000 wavelength blocker
3000 optical coupling unit
4000 optical demultiplexing unit
5000 optical multiplexing unit
6000-1 to 6000-$n$ optical transmission/reception device
7000 ROADM system

The invention claimed is:

1. An optical branching/coupling device comprising:
a first optical demultiplexer comprising an input port, a first output port and a plurality of second output ports, wherein the first optical demultiplexer is configured to demultiplex a first wavelength-multiplexed optical signal inputted to the first optical demultiplexer into a plurality of first demultiplexed optical signals of different respective wavelengths;
a first optical receiver that is connected directly to the first output port of the optical demultiplexer, and is configured to receive one of the plurality of first demultiplexed optical signals;
a first optical multiplexer comprising a plurality of input ports, connected to the plurality of second output ports of the first optical demultiplexer, and an output port, wherein the first optical multiplexer is configured to multiplex together at least two of the first demultiplexed optical signals;
a second optical demultiplexer comprising an input port, a first output port, and a plurality of second output ports, wherein the second optical demultiplexer is configured to demultiplex a second wavelength-multiplexed optical signal inputted to the second optical demultiplexer into a plurality of second demultiplexed optical signals of different respective wavelengths;
a second optical receiver that is connected directly to the first output port of the second optical demultiplexer, and is configured to receive one of the plurality of second demultiplexed optical signals;
a second optical multiplexer comprising a plurality of input ports, connected to the plurality of second output ports of the second optical demultiplexer and an output port, the second optical multiplexer configured to multiplex together at least two of the second demultiplexed optical signals produced by the second optical demultiplexer; and
an optical path selector comprising a first input port, connected to the output port of the first optical multiplexer, a second input port, connected to the output port of the second optical multiplexer, a plurality of output ports, a first optical splitter, a second optical splitter, a first optical switch, and a second optical switch wherein
the first optical splitter splits a multiplexed signal outputted from the first optical multiplexer into two or more identical signals,
the second optical splitter splits a multiplexed signal outputted from the second optical multiplexer into two or more identical signals,
an input port of the first optical splitter is connected to the first input port of the optical path selector,
an input port of the second optical splitter is connected to the second input port of the optical path selector;
each output port of the first optical splitter is connected to a first input port of the first optical switch and a first input port of the second optical switch,
each output port of the second optical splitter is connected to a second input port of the first optical switch and a second input port of the second optical switch, and
the first optical switch and the second optical switch are configured to output at least one of a multiplexed optical signal produced by the first optical multiplexer and a multiplexed optical signal produced by the second optical multiplexer.

2. The optical branching/coupling device according to claim 1, further comprising a third optical receiver which is configured to receive one of the multiplexed output optical signal produced by the first optical multiplexer and the multiplexed optical signal produced by the second optical multiplexer, output by the first optical switch and the second optical switch, wherein
the third optical receiver comprises an optical wavelength selector which is configured to receive only an optical signal component of a predetermined wavelength among those included in the one of the multiplexed output optical signal produced by the first optical multiplexer and the multiplexed optical signal produced by the second optical multiplexer, output by the first optical switch and the second optical switch.

3. The optical branching/coupling device according to claim 2, wherein the third optical receiver comprises a digital coherent optical receiver and a local selection function configured to select a wavelength to receive.

4. The optical branching/coupling device according to claim 1, further comprising a wavelength filter which is configured to transmit only an optical signal component of a predetermined wavelength of the at least two multiplexed optical signals produced by the first optical multiplexer and the at least two multiplexed optical signals produced by the second optical multiplexer from the optical path selector.

5. The optical branching/coupling device according to claim 4, wherein the wavelength filter is a variable wavelength filter.

6. An optical communication system comprising two or more optical communication devices, each of the optical communication devices further comprising:
the optical branching/coupling device according to claim 1; and
an optical coupler which branches an optical path connected to a transmission line for transmitting a wavelength-multiplexed optical signal and thereby connects the optical path with the optical branching/coupling device.

7. An optical branching/coupling method comprising:
demultiplexing an inputted first wavelength-multiplexed optical signal into optical signals of respective wavelengths;
demultiplexing an inputted second wavelength-multiplexed optical signal into optical signals of respective wavelengths;
receiving at least one of the plurality of first demultiplexed optical signal;
receiving at least one of the plurality of second demultiplexed optical signal;
multiplexing together at least two of the demultiplexed optical signals;
splitting a multiplexed signal outputted from the first optical multiplexer into two or more identical signals;
splitting a multiplexed signal outputted from the second optical multiplexer into two or more identical signals;
selectively outputting at least one of the first wavelength-multiplexed optical signal having experienced the demultiplexing and subsequent multiplexing and the second wavelength-multiplexed optical signal having experienced the demultiplexing and subsequent multiplexing.

8. An optical branching/coupling device comprising:
a plurality of optical transmitters configured to output an optical signal to an optical path selector;
a first optical multiplexer comprising an input port and a plurality of output ports;

a first optical demultiplexer comprising a first input port, and a plurality of second input ports, connected to the plurality of output ports of the first optical multiplexer;

a first optical transmitter connected directly to the first input port of the first optical demultiplexer;

a second optical multiplexer comprising an input port and a plurality of output ports;

a second optical demultiplexer comprising a first input port, and a plurality of second input ports, connected to the plurality of output ports of the second optical multiplexer;

a second optical transmitter is connected directly to the first output port of the second optical demultiplexer; wherein the optical path selector is configured to multiplex together optical signals outputted from at least a third optical transmitter and a forth optical transmitter, and output a multiplexed signal to one of the first optical multiplexer and the second optical multiplexer;

when one of the first optical multiplexer and second optical multiplexers receives the multiplexed signal from the optical path selector, the one of the first optical multiplexer and second optical multiplexers demultiplexes the optical signal outputted from the optical path selector;

the first optical demultiplexer is configured to multiplex together optical signals from the first optical transmitter and from the first optical multiplexer, and is configured to output a multiplexed signal; and the second optical demultiplexer is configured to multiplex together optical signals from the second optical transmitter and from the second optical multiplexer, and is configured to output a multiplexed signal.

* * * * *